United States Patent
Kong et al.

(10) Patent No.: US 8,014,743 B1
(45) Date of Patent: Sep. 6, 2011

(54) METHODS AND APPARATUS FOR CALIBRATING RECEIVED SIGNAL STRENGTH INDICATORS

(75) Inventors: Ronghui Kong, Shanghai (CN); Dawei Guo, Shanghai (CN)

(73) Assignee: Beken Corporation, Shanghai (CN)

( * ) Notice: Subject to any disclaimer, the term of this patent is extended or adjusted under 35 U.S.C. 154(b) by 0 days.

(21) Appl. No.: 13/092,947

(22) Filed: Apr. 24, 2011

Related U.S. Application Data

(62) Division of application No. 12/257,209, filed on Oct. 23, 2008, now Pat. No. 7,974,598.

(30) Foreign Application Priority Data

Jul. 4, 2008 (CN) .......................... 2008 1 0043593

(51) Int. Cl.
*H04B 17/00* (2006.01)
(52) U.S. Cl. ............... 455/226.2; 455/226.1; 455/251.1; 455/67.11; 455/67.12
(58) Field of Classification Search .................. 455/135, 455/154.1, 226.1, 226.2, 241.1, 242.2, 251.1, 455/67.11, 67.14
See application file for complete search history.

(56) References Cited

U.S. PATENT DOCUMENTS

2006/0234664 A1* 10/2006 Chiu et al. .................... 455/285
* cited by examiner

*Primary Examiner* — Tuan Pham
(74) *Attorney, Agent, or Firm* — Perkins Coie LLP

(57) ABSTRACT

This disclosure discloses methods and apparatus for calibrating received signal strength indicators.

6 Claims, 5 Drawing Sheets

US 8,014,743 B1

METHODS AND APPARATUS FOR CALIBRATING RECEIVED SIGNAL STRENGTH INDICATORS

CROSS-REFERENCE TO RELATED APPLICATION

This application is a divisional of U.S. patent application Ser. No. 12/257,209 filed Oct. 23, 2008, now U.S. Pat. No. 7,974,598 which claims priority to Chinese Patent Application No. 200810043593.4, filed Jul. 4, 2008, both of which are hereby incorporated by reference in their entirety.

TECHNICAL FIELD

The present disclosure is related to methods and apparatus for calibrating received signal strength indicators in wireless devices.

BACKGROUND

A received signal strength indicator (RSSI) provides information regarding the received power level of a radio frequency (RF) signal at a wireless device (e.g., a cellular phone, a wireless phone, a wireless network card, etc.) Based on the RSSI, the wireless device can then determine whether to continue or terminate operation and can adjust amplifier gains and/or frequency bandwidth of various internal components.

FIG. 1 is a schematic diagram illustrating a rectifier 10 for measuring RSSI in accordance with the prior art. As shown in FIG. 1, the rectifier 10 includes a capacitor 14 coupled to a bias resistor 16, a diode 18, and a low pass filter 20. The capacitor 14, the diode 18, and the low pass filter 20 together convert the received radio frequency signal 12 into a low frequency signal. The envelope power level of the low frequency signal then provides the measured RSSI 22.

The measurement of RSSI, however, can be susceptible to environmental and/or process influence. Operating temperatures, inherent silicon mismatch of internal components, and/or other factors may cause the measured RSSI to be inaccurate. For example, the measured RSSI may falsely indicate insufficient signal levels even when the received signal has sufficient strength. Such inaccuracy may cause the wireless device to malfunction.

A conventional technique for addressing the inaccuracy includes trimming the rectifier with resistors by, e.g., adjusting the resistance of the bias resistor 16. However, trimming with resistors is laborious and costly because different resistors must be individually formed or attached to each chip. Trimming with resistors can also be inefficient because the trimming only affects the measured RSSI at a particular operating state. As a result, an efficient technique for addressing the inaccuracy in RSSI measurement is desired.

DETAILED DESCRIPTION

The following disclosure describes several embodiments of methods and apparatus for calibrating RSSI measuring devices. Several details describing well-known structures or processes often associated with radio frequency (RF) communication systems are not set forth in the following description for purposes of brevity and clarity. Also, several other embodiments of the invention can have different configurations, components, or procedures than those described in this section. A person of ordinary skill in the art, therefore, will accordingly understand that the invention may have other embodiments with additional elements, or the invention may have other embodiments without several of the elements shown and described below with reference to FIGS. 2-5.

RSSI Measuring Device

Figure 2:
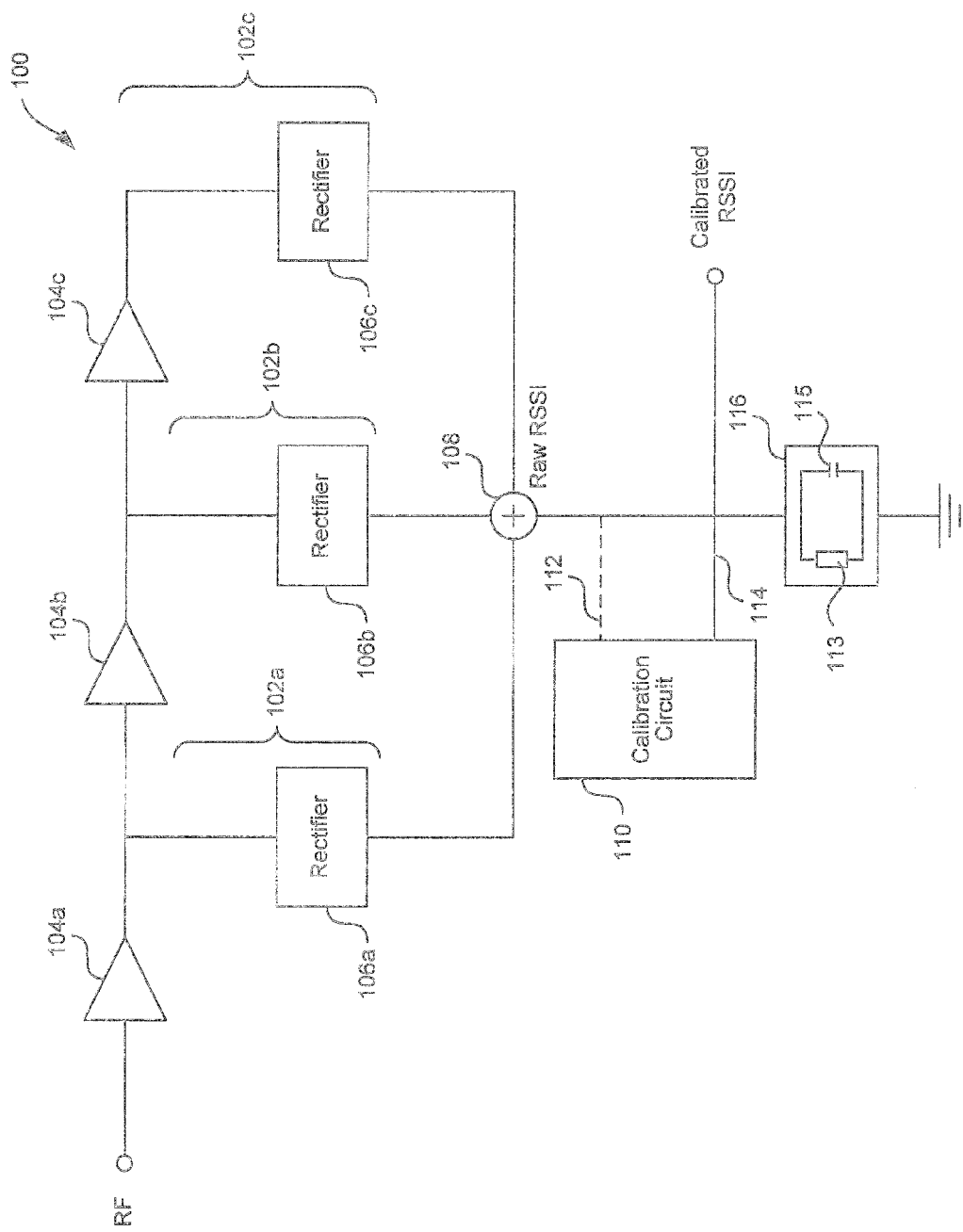
FIG. 2 is a schematic diagram illustrating an RSSI measuring device in accordance with an embodiment of the invention.
Figure 3:
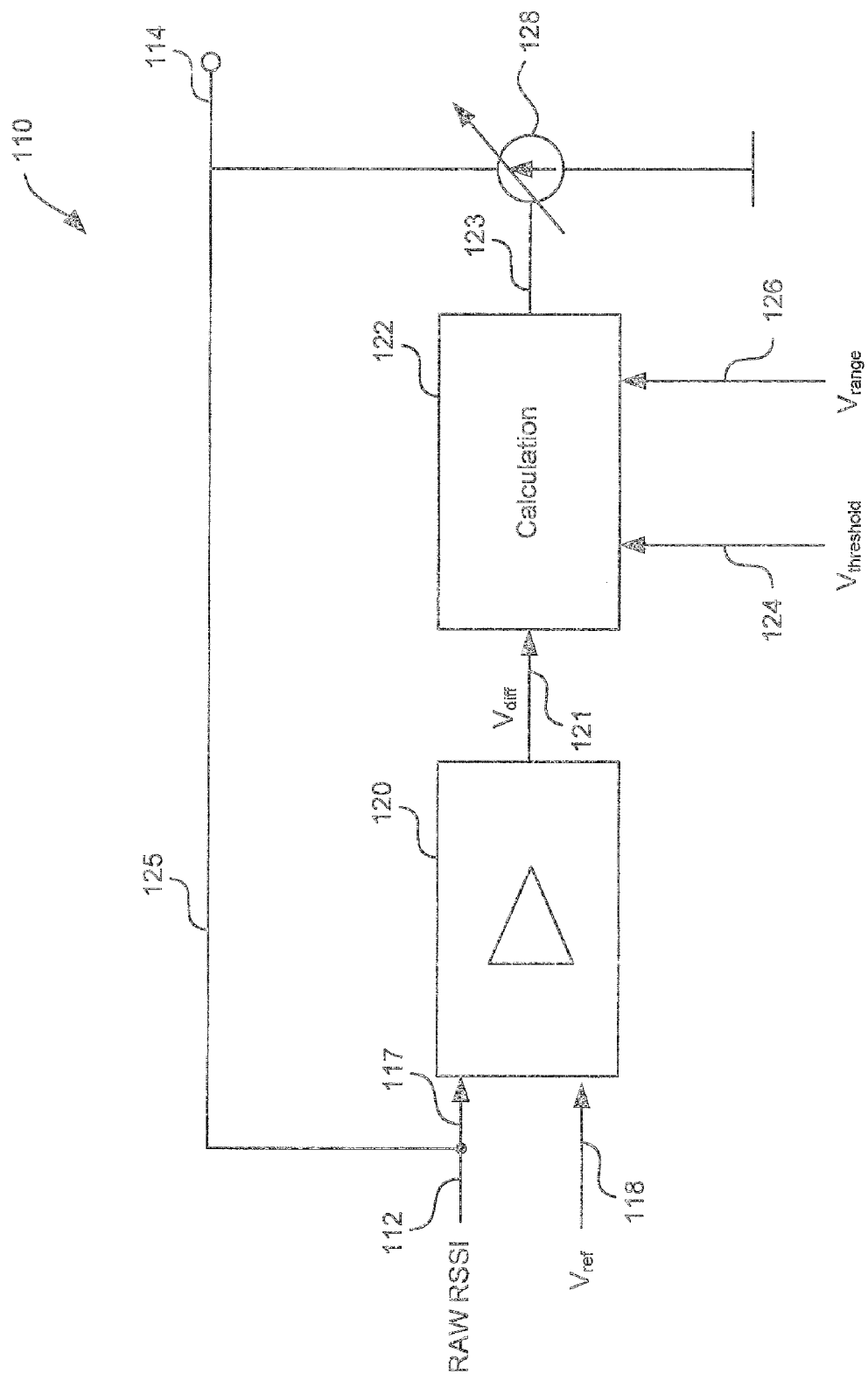
FIG. 3 is a schematic diagram illustrating a calibration circuit useable for the RSSI measuring device in FIG. 2 in accordance with an embodiment of the invention.
Figure 4:
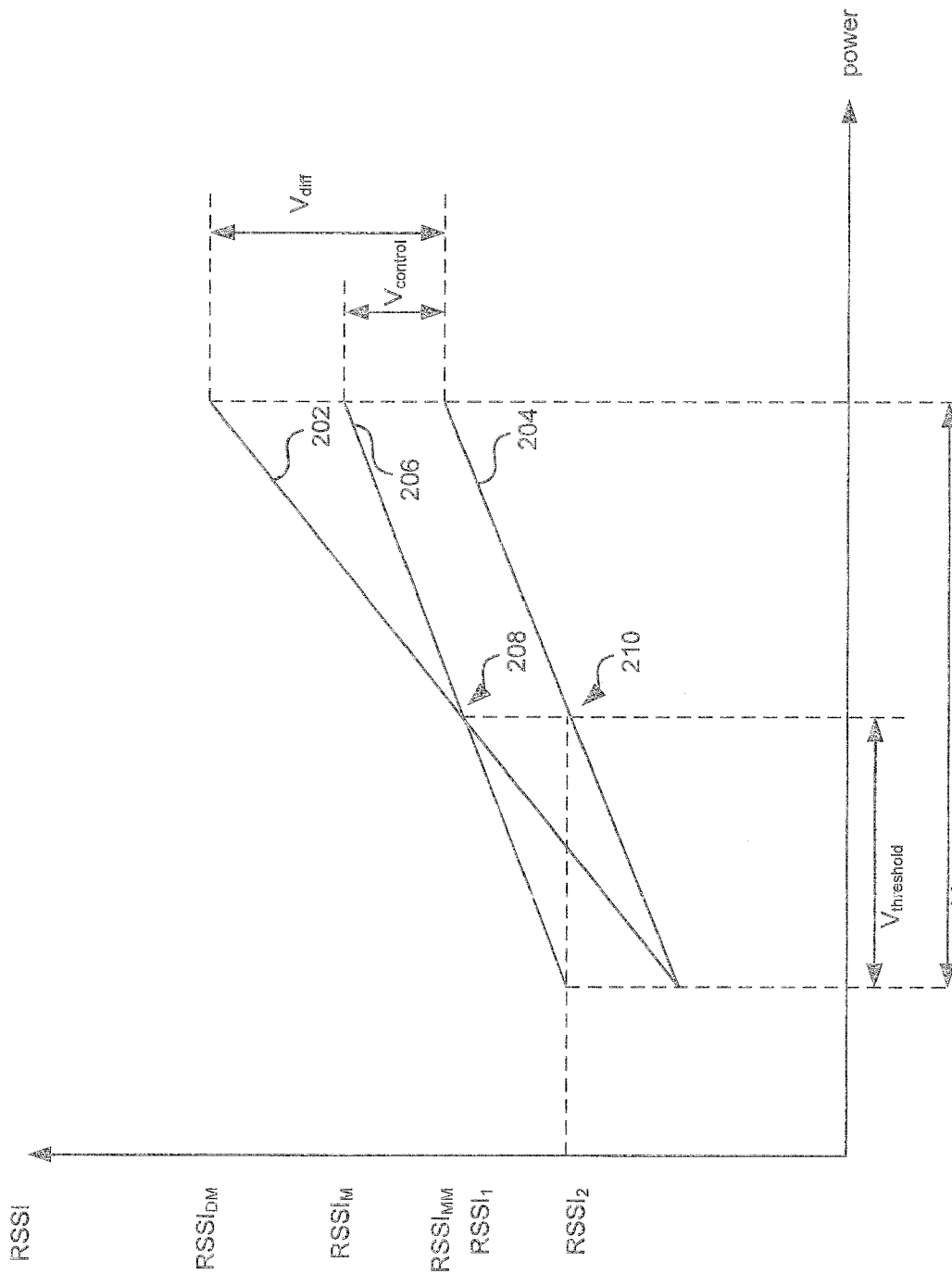
FIG. 4 is an RSSI versus signal power diagram in accordance with an embodiment of the invention.

Several embodiments of an RSSI detector 100 are described below with reference to FIGS. 2-4. In particular, FIG. 2 is a schematic diagram illustrating the RSSI detector 100 in accordance with an embodiment of the invention. FIG. 3 is a schematic diagram illustrating a calibration circuit 110 useable for the RSSI detector 100. FIG. 4 is an RSSI versus signal power diagram 200 schematically illustrating a calibration process suitable for the RSSI detector 100 in FIGS. 2 and 3. The RSSI detector 100 can be incorporated into a cellular phone, a wireless phone, a wireless network card, and/or other suitable wireless communication devices.

Figure 1:
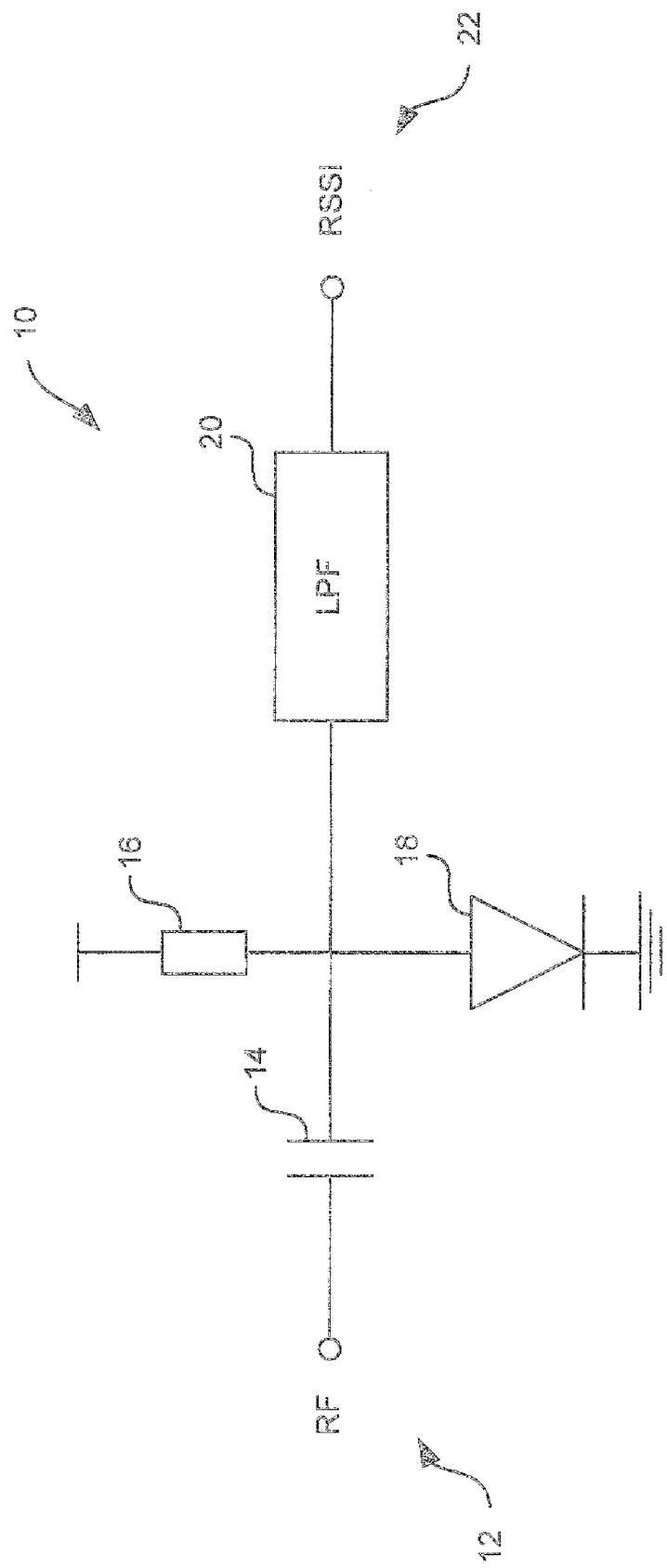
FIG. 1 is a schematic diagram illustrating a rectifier for measuring RSSI in accordance with the prior art.

As shown in FIG. 2, the RSSI detector 100 can include a plurality of amplifier and rectifier stages 102 (identified individually as a first stage 102a, a second stage 102b, and a third stage 102c). Individual stages 102 can include amplifiers 104 (identified individually as a first amplifier 104a, a second amplifier 104b, and a third amplifier 104c) coupled to corresponding rectifiers 106 (identified individually as a first rectifier 106a, a second rectifier 106b, and a third rectifier 106c). The amplifiers 104 can include transistor-type amplifiers with suitable gains and operational bandwidth. The rectifiers 106 can include components generally similar to that described above in FIG. 1. Even though three stages 102 are illustrated in FIG. 2, in other embodiments, the RSSI detector 100 can include one, two, or any desired number of stages.

The RSSI detector 100 can include a summing device 108 configured to combine output from the first, second, and third rectifiers 106a-c. The combined output is hereinafter referred to as the Raw RSSI. In certain embodiments, the various signals (e.g., the Raw RSSI) can be represented by a current; however, in other embodiments, the Raw RSSI can also be represented by a voltage or other suitable quantities.

The RSSI detector 100 can further include a low pass filter 116 coupled to the output of the summing device 108 and a bias output 114. The low pass filter 116 is configured to reject high frequency signals and allow low frequency signals to pass through as the calibrated RSSI. In the illustrated embodiment, the low pass filter 116 includes an RC circuit having a resistor 113 coupled to a capacitor 115. In other embodiments, the low pass filter 116 can also include an LC circuit and/or other suitable circuit.

The RSSI detector 100 can additionally include the calibration circuit 110 coupled to the output of the summing device 108. In particular, the calibration circuit 110 includes a calibration input 112 configured to receive the Raw RSSI and the bias output 114 configured to inject a biasing signal (e.g., a biasing current) into the output from the summing device 108 before the low pass filter 116.

In one embodiment, as shown in FIG. 3, the calibration circuit 110 includes a comparison module 120, a calculation module 122, and an adjustable current source 128 connected in series. The comparison module 120 and/or the calculation module 122 can be implemented as an application-specific integrated circuit (ASIC), as a software module, and/or as other suitable hardware and/or software logic components. The adjustable current source 128 can include a current mirror circuit and/or other suitable current amplifier circuit.

The comparison module 120 includes the calibration input 112 carrying an input signal ($V_{input}$) and a reference input 118 carrying a reference signal ($V_{ref}$). The calibration input 112 can be coupled to the calibration input 112 carrying the Raw RSSI and/or other desired signal. In certain embodiments, the reference signal is the maximum desired power level for the RSSI detector 100. In other embodiments, the reference signal may include other desired values.

The comparison module 120 can be configured to derive a differential signal ($V_{diff}$) based on the input signal and the reference signal as follows:

$$V_{diff} = V_{ref} - V_{input}$$

The differential signal at least partially reflects any environmental and/or process influence upon the RSSI detector 100. The comparison module 120 can also include a comparison output 121 coupled to the calculation module 122. During operation, the comparison module 120 provides the differential signal to the calculation module 122.

The calculation module 122 can be configured to perform analog or digital calculations and/or logic operations based at least partially on the differential signal from the comparison module 120 to at least partially compensate for the environmental and/or process influence. Certain embodiments of the calculation module 122 can include analog circuits, digital circuits, or a combination of analog and digital circuits. For example, the calculation module 122 can be implemented using digital dividers, multipliers, counters, and/or other digital logic components. In other examples, the calculation module 122 can also be implemented with operational amplifiers, transistors, and/or other analog components.

As shown in FIG. 3, the calculation module 122 includes a threshold input 124 carrying a threshold signal ($V_{threshold}$) and a range input 126 carrying a range signal ($V_{range}$). In one embodiment, the threshold signal includes a power threshold value at which the RSSI detector 100 indicates sufficient power, and the range signal includes a desired power range of the RSSI detector 100. In other embodiments, the threshold signal and/or the range signal can include other desired values. Even though the power threshold signal and the power range signal are shown as input to the calculation module 122, in other embodiments, the calculation module 122 can include internal memory (not shown) in which the threshold signal and/or the range signal can be stored.

The calculation module 122 can be configured to calculate a control signal ($V_{control}$) carried by an output 123 for controlling the adjustable current source 128 as described in more detailed below. In one embodiment, the calculation module 122 calculates the control signal based on the differential signal, the threshold signal, and the range signal. In other embodiments, the control signal can also be calculated based on any combination of the differential signal, the threshold signal, and the range signal. In further embodiments, the control signal may be calculated based on other parameters.

Referring to FIGS. 2 and 3 together, during calibration, the calculation module 122 and the adjustable current source 128 are first reset. As a result, the adjustable current source 128 does not output a biasing signal to the bias output 114. Subsequently, a maximum radio frequency signal is applied to the RSSI detector 100. The amplifiers 104 and the rectifiers 106 then convert the radio frequency signal into a low frequency signal and measure the envelope power of the low frequency signal. The summing device 108 then sums all the measured envelope power signals from the rectifiers 106 to derive the Raw RSSI. As a result, the Raw RSSI represents a measured maximum power level for the RSSI detector 100 without biasing.

The comparison module 120 then compares the input signal with the reference signal to derive the differential signal. Because the biasing signal is reset, the input signal is equal to the Raw RSSI. As described above, in certain embodiments, the reference signal is the maximum desired power level for the RSSI detector 100. As a result, the differential signal represents a difference between the maximum desired power level and the maximum measured power level of the RSSI detector 100.

After receiving the differential signal, in one embodiment, the calculation module 122 then calculates the control signal based on the differential signal, the threshold signal, and the range signal as follows:

$$V_{control} = \frac{V_{threshold}}{V_{range}} \times V_{diff}$$

In other embodiments, the calculation module 122 can also calculate the control signal with additional and/or different parameters.

The adjustable current source 128 then uses the control signal to adjust its output and provide the biasing signal based on the control signal. In one embodiment, the biasing signal is a biasing current ($I_{bias}$) set equal to a value calculated as follows:

$$I_{bias} = \frac{V_{control}}{R}$$

where R is the resistance of the resistor 113 in the low pass filter 116. As discussed in more detail below with reference to FIG. 4, the biasing signal can influence the output loading of the summing device 108 and, as a result, provide a more accurate RSSI indication than conventional devices.

Optionally, in one embodiment, the calibration circuit 122 can be configured to monitor the input signal at the calibration input 112 and modify the biasing signal from the adjustable current source 128 until the differential signal is within a desired threshold from a desired value. In another embodiment, the calibration process can be repeated based on a predetermined number of times, not based on the current value of the input signal. In other embodiments, the calibration process can be repeated and/or terminated based on other conditions.

FIG. 4 schematically illustrates the calibration process discussed above with reference to FIGS. 2 and 3. As shown in FIG. 4, a first plot 202 represents a desired RSSI versus signal power relationship, and a second plot 204 represents an RSSI versus signal power relationship without biasing. As can be seen from FIG. 4, at a desired power threshold, the second plot 204 indicates a second RSSI level 210 ($RSSI_2$) that is less than a first RSSI 208 (RSSI$_1$) indicated by the first plot 202. As a result, the RSSI detector 100 (FIG. 2) may falsely indicate that the signal power level is inadequate when it is adequate.

To at least partially remedy the above operational difficulty, the adjustable current source 128 (FIG. 3) biases the output loading of the summing device 108 (FIG. 2) such that the second plot 204 is shifted toward the first plot 202 (e.g., upwardly) as represented by a third plot 206. The shift toward the first plot 202 can have an offset generally equal to the control signal. As a result, at least in the vicinity of the first RSSI 208, the RSSI signals indicated by the third plot 206 more closely approximate those indicated by the first plot 202 than those indicated by the second plot 204, and thus provide a more accurate representation of the received power level.

Even though the RSSI detector 100 described above is configured to modify the offset of the RSSI versus power plot, in other embodiments, the slope of the measured RSSI versus power plot can also be modified. For example, individual rectifiers 106a-c (FIG. 2) can be coupled to one calibration circuit 110 (FIG. 2) before output from the rectifiers 106a-c is summed at the summing device 108. In further embodiments, both the slope and the offset of the RSSI versus power plot can be modified.

RSSI Calibration Method

Figure 5:
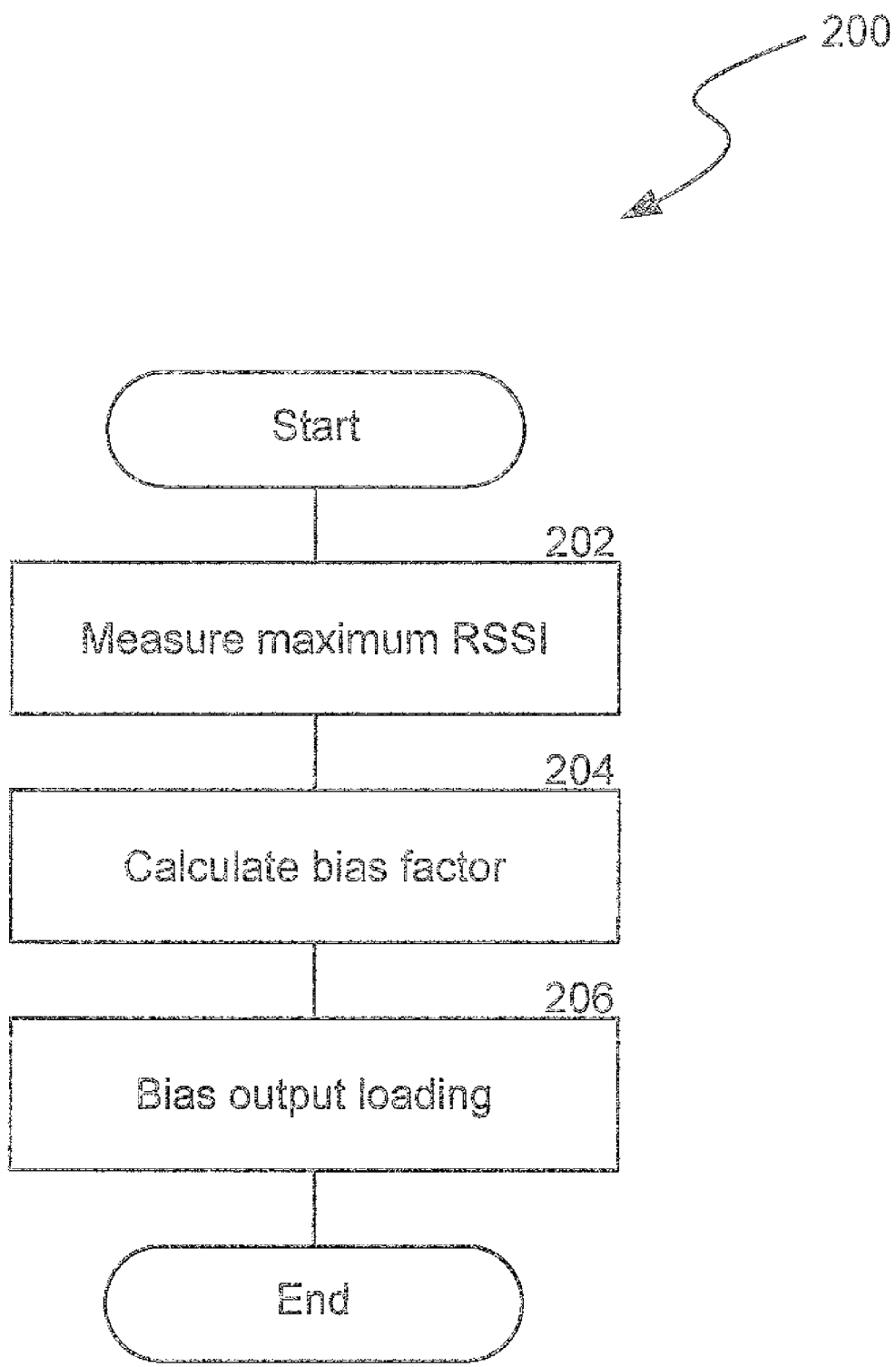
FIG. 5 is a flowchart illustrating a method of calibrating an RSSI measuring device in accordance with embodiments of the present invention.

FIG. 5 is a flowchart illustrating a method 300 of calibrating an RSSI measuring device in accordance with embodiments of the present invention. Even though the description below may use the RSSI detector 100 in FIG. 2 as an example, the method 300 may also be applied in other RSSI measuring devices.

An early stage 302 of the method 300 includes measuring a maximum RSSI ($V_{measured\_RSSI}$) when the RSSI detector 100 is exposed to a maximum radio frequency signal. In one embodiment, the maximum RSSI can be measured in the analog domain using one or more stages of amplifiers 104 and rectifiers 106 (FIG. 2). The resulting maximum RSSI can be represented by a DC signal. In other embodiments, the maximum RSSI can be measured in the digital domain with an analog-to-digital converter, and the resulting maximum RSSI can be represented by a code with certain bit size (e.g., 8 bits). In further embodiments, the maximum RSSI can be measured using other techniques and represented in any desired fashion.

Another stage 304 of the method 300 includes calculating a bias factor based on the measured maximum RSSI. In one embodiment, calculating the bias factor can include calculating an offset factor (Offset_Factor) based on the measured maximum RSSI, a desired maximum RSSI ($V_{desired\_RSSI}$), a desired threshold ($V_{threshold}$), and a desired power range ($V_{range}$) for the RSSI detector 100 as follows:

$$\text{Offset\_Factor} = \frac{V_{threshold}}{V_{range}} \times (V_{desired\_RSSI} - V_{measured\_RSSI})$$

In certain embodiments, the scaling factor can also be adjusted with a constant and/or other parameters.

In other embodiments, calculating the bias factor can include calculating a slope factor (Slope_Factor) based on the measured maximum RSSI, the desired maximum RSSI ($V_{designed\_RSSI}$), and a maximum desired power level ($V_{max\_power}$) of the RSSI detector 100 as follows:

$$\text{Slope\_Factor} = \frac{V_{desired\_RSSI} - V_{max\_power}}{V_{measured\_RSSI} - V_{max\_power}}$$

A further stage 306 of the method 300 includes biasing an output of the RSSI detector 100 with a loading based on the calculated bias factor. In one embodiment, the output of the RSSI detector 100 ($V_{calibrated\_RSSI}$) is increased by an amount at least approximately equivalent to the offset factor over the entire power range as follows:

$$V_{calibrated\_RSSI} = V_{Raw\_RSSI} + \text{Offset\_Factor}$$

In another embodiment, the output of the RSSI detector 100 is decreased by an amount at least approximately equivalent to the offset factor over the entire power range as follows:

$$V_{calibrated\_RSSI} = V_{Raw\_RSSI} - \text{Offset\_Factor}$$

In further embodiments, the output of the RSSI detector 100 is biased by the slope factor such that the slope of the measured RSSI versus power plot substantially coincides with that of the desired RSSI versus power plot as follows:

$$V_{calibrated\_RSSI} = V_{Raw\_RSSI} \times \text{Slope\_Factor}$$

While the above description describes certain embodiments of the invention, and describes the best mode contemplated, no matter how detailed the above appears in text, the invention can be practiced in many ways. Details of the system may vary in implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

We claim:

1. A method for calibrating a received signal strength indicator (RSSI) detector, comprising:
   measuring a maximum RSSI when the RSSI detector is exposed to a maximum radio frequency signal;
   calculating a bias factor based on the measured maximum RSSI including calculating an offset as:

$$\text{Offset} = \frac{V_{threshold}}{V_{range}} \times (V_{designed\_RSSI} - V_{measured\_RSSI})$$

where $V_{measured\_RSSI}$ is the measured maximum RSSI, $V_{designed\_RSSI}$ is a desired maximum RSSI, $V_{threshold}$ is a desired threshold, and $V_{range}$ is a desired power range; and
   biasing an output of the RSSI detector with a power loading based on the calculated bias factor.

2. The method of claim 1 wherein measuring a maximum RSSI includes measuring the maximum RSSI in the digital domain, and wherein calculating a bias factor includes calculating the bias factor in the analog domain.

3. The method of claim 1 wherein biasing an output of the RSSI detector includes biasing the output of the RSSI detector with a voltage generally equal to the offset.

4. A method for calibrating a received signal strength indicator (RSSI) detector, comprising:
  measuring a maximum RSSI when the RSSI detector is exposed to a maximum radio frequency signal;
  calculating a bias factor based on the measured maximum RSSI including calculating a slope bias as:

$$\text{Slope\_Bias} = \frac{V_{designed\_RSSI} - V_{max\_power}}{V_{measured\_RSSI} - V_{max\_power}}$$

where $V_{designed\_RSSI}$ is the desired maximum indicator value, $V_{max\_power}$ is the desired maximum power level, and $V_{measured\_RSSI}$ is the measured maximum indicator value; and
  biasing an output of the RSSI detector with a power loading based on the calculated bias factor.

5. The method of claim 4 wherein biasing an output of the RSSI detector includes biasing the output of the RSSI detector with the slope bias such that a slope of a measured RSSI versus power plot substantially coincides with that of a desired RSSI versus power plot.

6. A received signal strength indicator (RSSI) detector, comprising:
  means for measuring a maximum RSSI when the RSSI detector is exposed to a maximum radio frequency signal; and
  means for calculating a bias factor based on the measured maximum RSSI and biasing an output of the RSSI detector with a power loading based on the calculated bias factor
  wherein the means for calculating a bias factor include means for calculating an offset as:

$$\text{Offset} = \frac{V_{theshold}}{V_{range}} \times (V_{designed\_RSSI} - V_{measured\_RSSI})$$

where $V_{measured\_RSSI}$ is the measured maximum RSSI, $V_{designed\_RSSI}$ is a desired maximum RSSI, $V_{threshold}$ is a desired threshold, and $V_{range}$ is a desired power range.

* * * * *